United States Patent
Lee et al.

(10) Patent No.: US 12,445,507 B2
(45) Date of Patent: Oct. 14, 2025

(54) DEVICE TYPE-BASED CONTENT ELEMENT MODIFICATION

(71) Applicant: Zoom Communications, Inc., San Jose, CA (US)

(72) Inventors: Cynthia Eshiuan Lee, Austin, TX (US); Jeffrey William Smith, Layton, UT (US); Jordan Thiel, Leander, TX (US)

(73) Assignee: Zoom Communications, Inc., San Jose, CA (US)

( * ) Notice: Subject to any disclaimer, the term of this patent is extended or adjusted under 35 U.S.C. 154(b) by 0 days.

(21) Appl. No.: 18/323,214

(22) Filed: May 24, 2023

(65) Prior Publication Data

US 2023/0300179 A1 Sep. 21, 2023

Related U.S. Application Data

(63) Continuation of application No. 17/389,279, filed on Jul. 29, 2021, now Pat. No. 11,785,060.

(51) Int. Cl.
*H04L 65/401* (2022.01)
*G06F 3/0484* (2022.01)

(52) U.S. Cl.
CPC ........ *H04L 65/4015* (2013.01); *G06F 3/0484* (2013.01)

(58) Field of Classification Search
CPC .................. H04L 65/4015; G06F 3/0484
See application file for complete search history.

(56) References Cited

U.S. PATENT DOCUMENTS

| 5,025,314 | A  | * | 6/1991  | Tang ........................ H04N 7/15 |
|           |    |   |         | 434/350                                 |
| 6,337,681 | B1 |   | 1/2002  | Martin                                  |
| 9,430,140 | B2 |   | 8/2016  | Reuschel et al.                         |
| 9,479,549 | B2 |   | 10/2016 | Pearson                                 |
| 10,102,824| B2 |   | 10/2018 | Khoury et al.                           |
| 10,572,135| B1 |   | 2/2020  | Fieldman                                |
| 2004/0021790 | A1 |  | 2/2004 | Iga                                     |
| 2005/0213739 | A1 | * | 9/2005 | Rodman ............... H04M 3/567      |
|           |    |   |         | 379/202.01                              |

(Continued)

OTHER PUBLICATIONS

International Search Report and Written Opinion mailed on Nov. 4, 2022 in corresponding PCT Application No. PCT/US2022/038496.

*Primary Examiner* — William L Bashore
*Assistant Examiner* — Gregory A Distefano
(74) *Attorney, Agent, or Firm* — Young Basile Hanlon & MacFarlane, P.C.

(57) ABSTRACT

Content-aware device selection is performed for modifying content elements in digital collaboration spaces. A content element, such as a text box or drawing space, is detected within a digital collaboration space based on input received from a first device of a first device type. A second device type to use to modify the content element is determined based on a content type of the content element. One or more devices of that second device type which are authenticated to access the digital collaboration space are identified. At least one of those authenticated devices are then prompted for input to use to modify the content element. The content element is then modified within the digital collaboration space based on the input received from at least one of those prompted devices.

20 Claims, 8 Drawing Sheets

(56) References Cited

U.S. PATENT DOCUMENTS

| | | | |
|---|---|---|---|
| 2007/0168471 A1* | 7/2007 | Childress | H04L 67/303 |
| | | | 709/220 |
| 2008/0209327 A1 | 8/2008 | Drucker et al. | |
| 2009/0006660 A1 | 1/2009 | Bawcutt et al. | |
| 2010/0079369 A1 | 4/2010 | Hartmann et al. | |
| 2010/0228825 A1* | 9/2010 | Hegde | G06Q 10/06 |
| | | | 709/227 |
| 2011/0074667 A1 | 3/2011 | Robinson | |
| 2011/0107088 A1* | 5/2011 | Eng | H04L 9/0631 |
| | | | 713/155 |
| 2011/0167355 A1* | 7/2011 | Shelansky | G06F 21/41 |
| | | | 726/8 |
| 2014/0028778 A1 | 1/2014 | Shapiro et al. | |
| 2014/0380228 A1 | 12/2014 | Shu | |
| 2015/0149929 A1 | 5/2015 | Shepherd et al. | |
| 2015/0169069 A1 | 6/2015 | Lo et al. | |
| 2015/0179186 A1 | 6/2015 | Swierk et al. | |
| 2015/0271206 A1 | 9/2015 | Schultz et al. | |
| 2016/0321227 A1* | 11/2016 | Keslin | G06F 3/04842 |
| 2017/0199750 A1 | 7/2017 | Reuschel et al. | |
| 2017/0212643 A1 | 7/2017 | Stewart et al. | |
| 2017/0277498 A1* | 9/2017 | Wood, Jr. | G06F 3/0481 |
| 2017/0351471 A1 | 12/2017 | Passeri et al. | |
| 2017/0372449 A1 | 12/2017 | Yarvis et al. | |
| 2019/0130094 A1 | 5/2019 | Votaw et al. | |
| 2020/0218984 A1* | 7/2020 | Thornton | G06N 3/088 |
| 2021/0044645 A1 | 2/2021 | Jayaweera | |

* cited by examiner

DEVICE TYPE-BASED CONTENT ELEMENT MODIFICATION

CROSS-REFERENCE TO RELATED APPLICATION(S)

This application is a continuation of U.S. application Ser. No. 17/389,279, filed Jul. 29, 2021, the entire disclosure of which is herein incorporated by reference.

BACKGROUND

Enterprise entities rely upon several modes of communication to support their operations, including telephone, email, internal messaging, and the like. These separate modes of communication have historically been implemented by service providers whose services are not integrated with one another. The disconnect between these services, in at least some cases, requires information to be manually passed by users from one service to the next. Furthermore, some services, such as telephony services, are traditionally delivered via on-premises systems, meaning that remote workers and those who are generally increasingly mobile may be unable to rely upon them. One type of system which addresses problems such as these includes a unified communications as a service (UCaaS) platform, which includes several communications services integrated over a network, such as the Internet, to deliver a complete communication experience regardless of physical location.

SUMMARY

Disclosed herein are, inter alia, implementations of systems and techniques for content-aware device selection for modifying content elements in digital collaboration spaces.

One aspect of this disclosure is a method, which includes detecting a content element within a digital collaboration space based on input received from a first device of a first device type, determining a second device type for modifying the content element based on a content type associated with the content element, and modifying the content element within the digital collaboration space based on input received from a second device of the second device type.

Another aspect of this disclosure is an apparatus, which includes a memory and a processor configured to execute instructions stored in the memory to determine a device type for modifying a content element within a digital collaboration space based on a content type associated with the content element, prompt one or more devices of the device type for input to use to modify the content element, and modify the content element within the digital collaboration space based on input received from a device of the one or more devices.

Yet another aspect of this disclosure is a non-transitory computer readable medium storing instructions operable to cause one or more processors to perform operations, which include determining a device type for modifying a content element within a digital collaboration space based on a content type associated with the content element, and modifying the content element within the digital collaboration space based on input received from a device of the device type.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
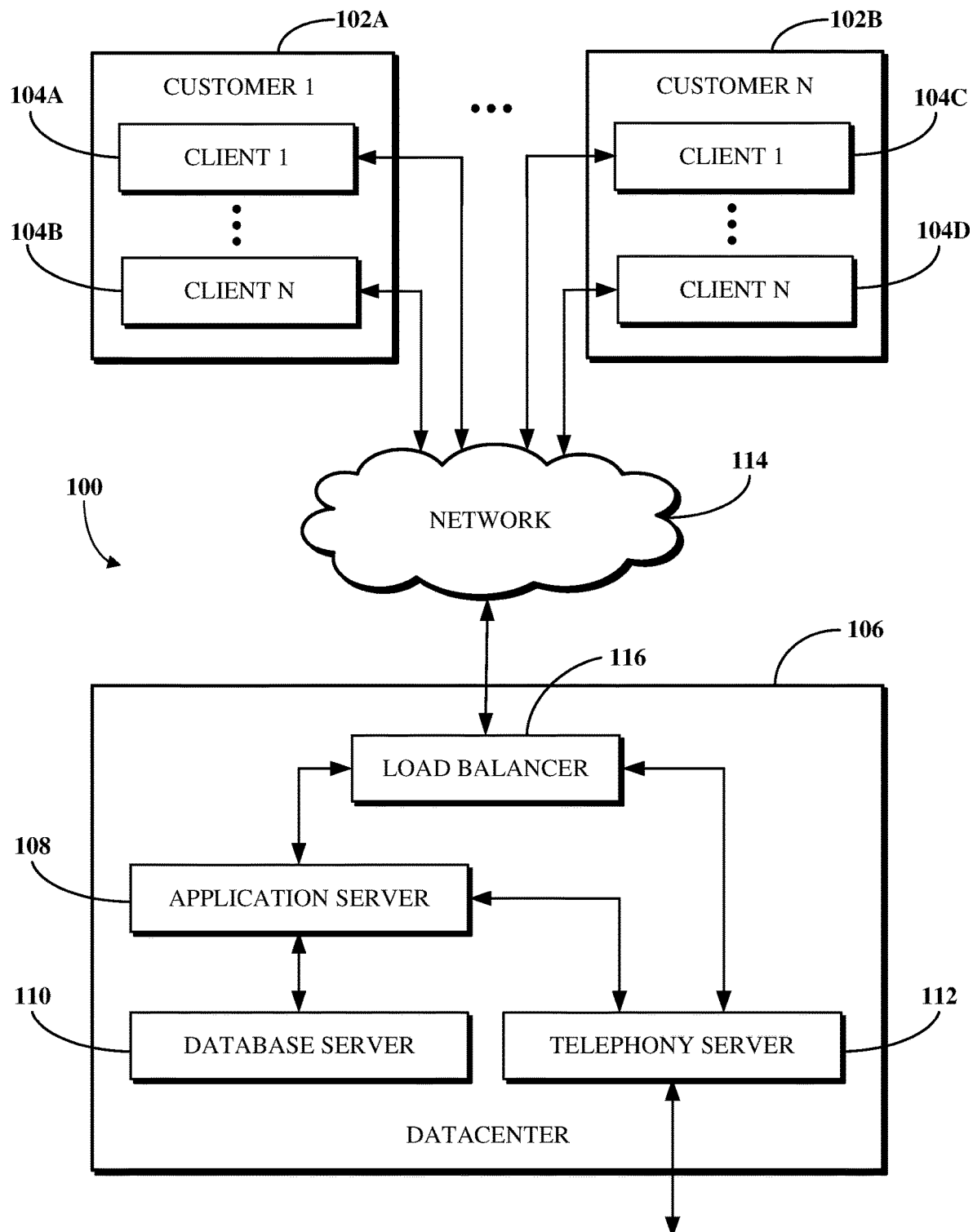
FIG. 1 is a block diagram of an example of an electronic computing and communications system.

Digital collaboration spaces are used by groups of people to collaborate on projects. Using a digital collaboration space, collaborators can add, modify, and remove content elements such as text boxes, drawing spaces, and the like to create documents, brainstorm ideas, and otherwise work together towards a project goal. Digital collaboration spaces generally update changes in real-time to show the same content to all connected device operators at any given time. In some cases, permissions associated with a digital collaboration space may be limited, such as to prevent access to the digital collaboration space other than by a set of device operators, modifications to content elements by certain device operators, or the like.

One challenge affecting the usability of a digital collaboration space is that certain devices are not optimized for interacting with certain content element types. For example, a conference room may include a digital whiteboard mounted on a wall, which displays a digital collaboration space and is configured to receive user input for modifying content elements thereof. The digital whiteboard, which generally features a large touchscreen interface, is very useful for displaying content and processing freeform input for drawing spaces or annotations. However, it is not optimized for text input given that it is generally difficult to proficiently type on a virtual keyboard, especially a large virtual keyboard which is potentially larger than a typical physical keyboard.

Further, size and other limitations typically prevent more than one person from simultaneously using the digital whiteboard at any given time. In many group collaboration settings, there may be several people sitting nearby the digital whiteboard, and at least some of them may have laptops, tablets, or other personal computing or mobile devices configured to access the digital collaboration space presented at the digital whiteboard. However, unless the digital collaboration space is hosted by an online service and those other devices log into that online service to access the digital collaboration space, there is generally no way for those other devices to interface with the digital whiteboard to add, modify, or remove content. Similarly, there is generally no way for the digital whiteboard or an associated system to prompt certain of those other devices which are optimized for a given content element type to provide input for modifying a subject content element.

Implementations of this disclosure address problems such as these using content-aware device selection for digital collaboration spaces. In particular, content-aware device selection is performed for modifying content elements in digital collaboration spaces. A content element, such as a text box or drawing space, is detected within a digital collaboration space based on input received from a first device of a first device type. A second device type is determined based on a content type of the content element. The second device type is a device type which is optimized to provide the type of input to use to modify the content element. Specifically, the second device type is determined to be a device type which is optimized to provide input for modifying the content element. One or more devices of that second device type which are authenticated to access the digital collaboration space are identified. At least one of those authenticated devices is then prompted for input to modify the content element. The content element is then modified within the digital collaboration space based on the input received from at least one of those prompted devices.

To describe some implementations in greater detail, reference is first made to examples of hardware and software structures used to implement a system for content-aware device selection for modifying content elements in digital collaboration spaces. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over internet protocol (VOIP)-enabled devices configured to send and receive calls over a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
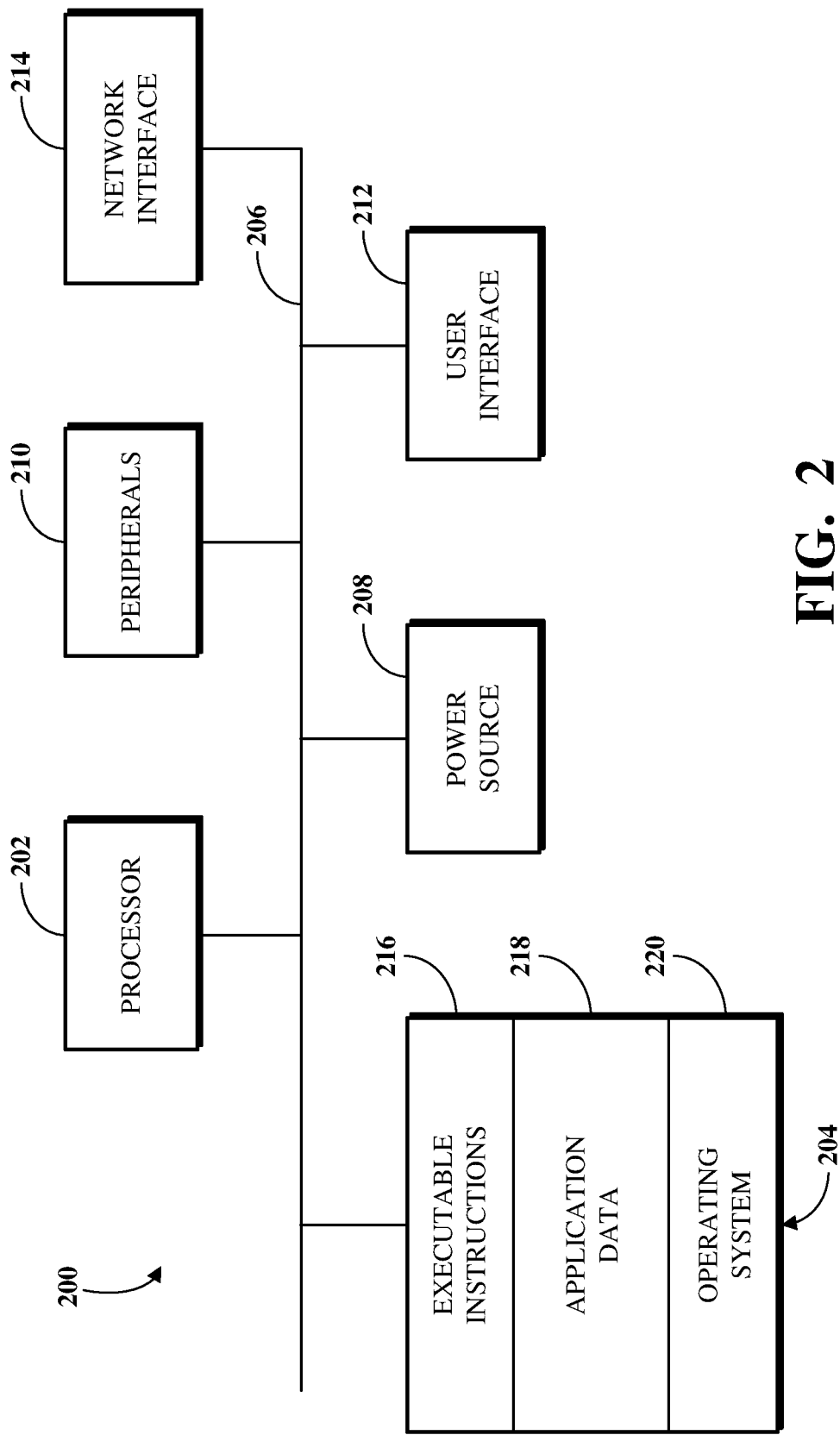
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
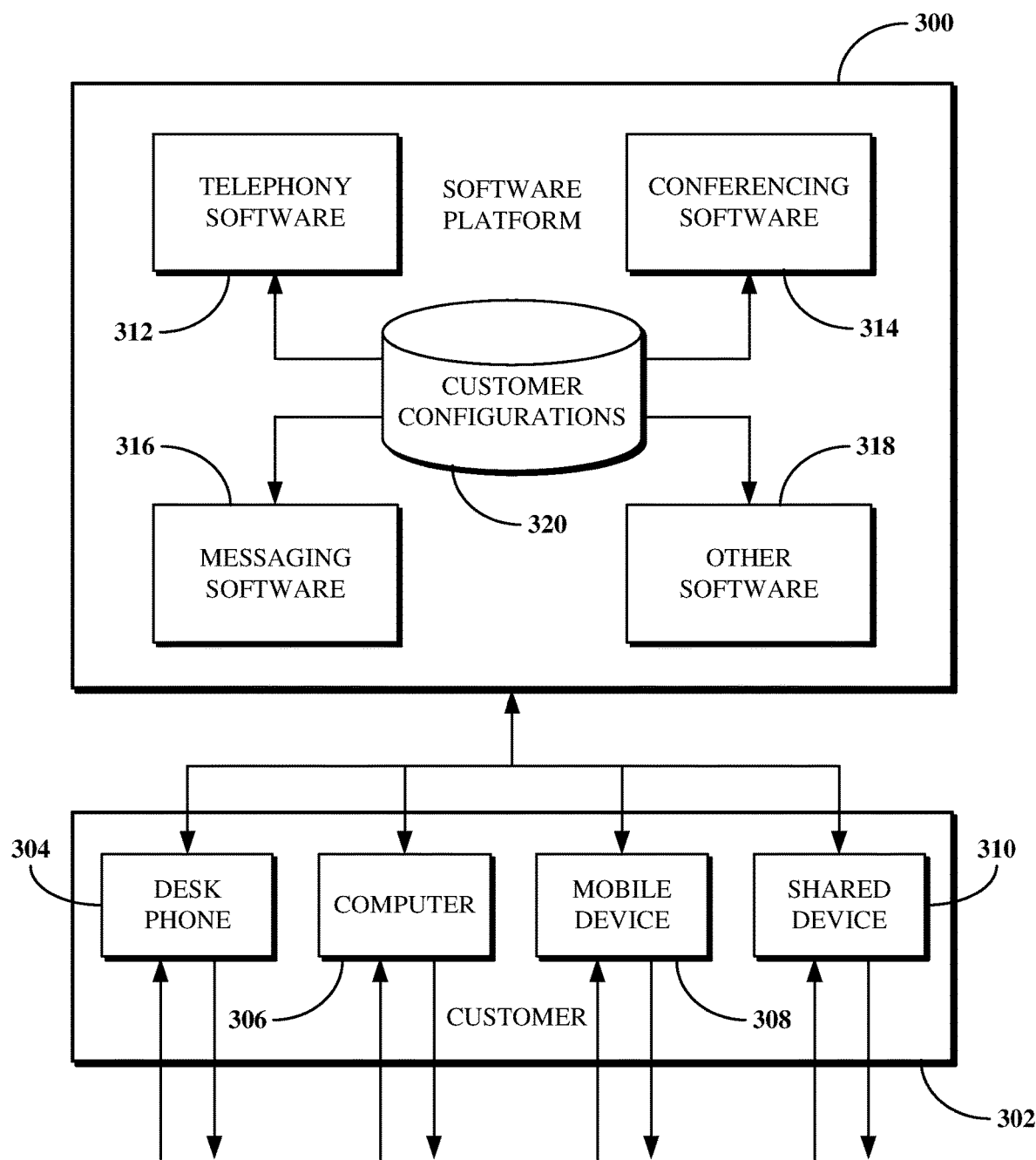
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients—a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include digital collaboration software for facilitating interactions within a digital collaboration space between devices of different device types and for prompting devices of device types corresponding to detected content elements for input usable to modify those content elements.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
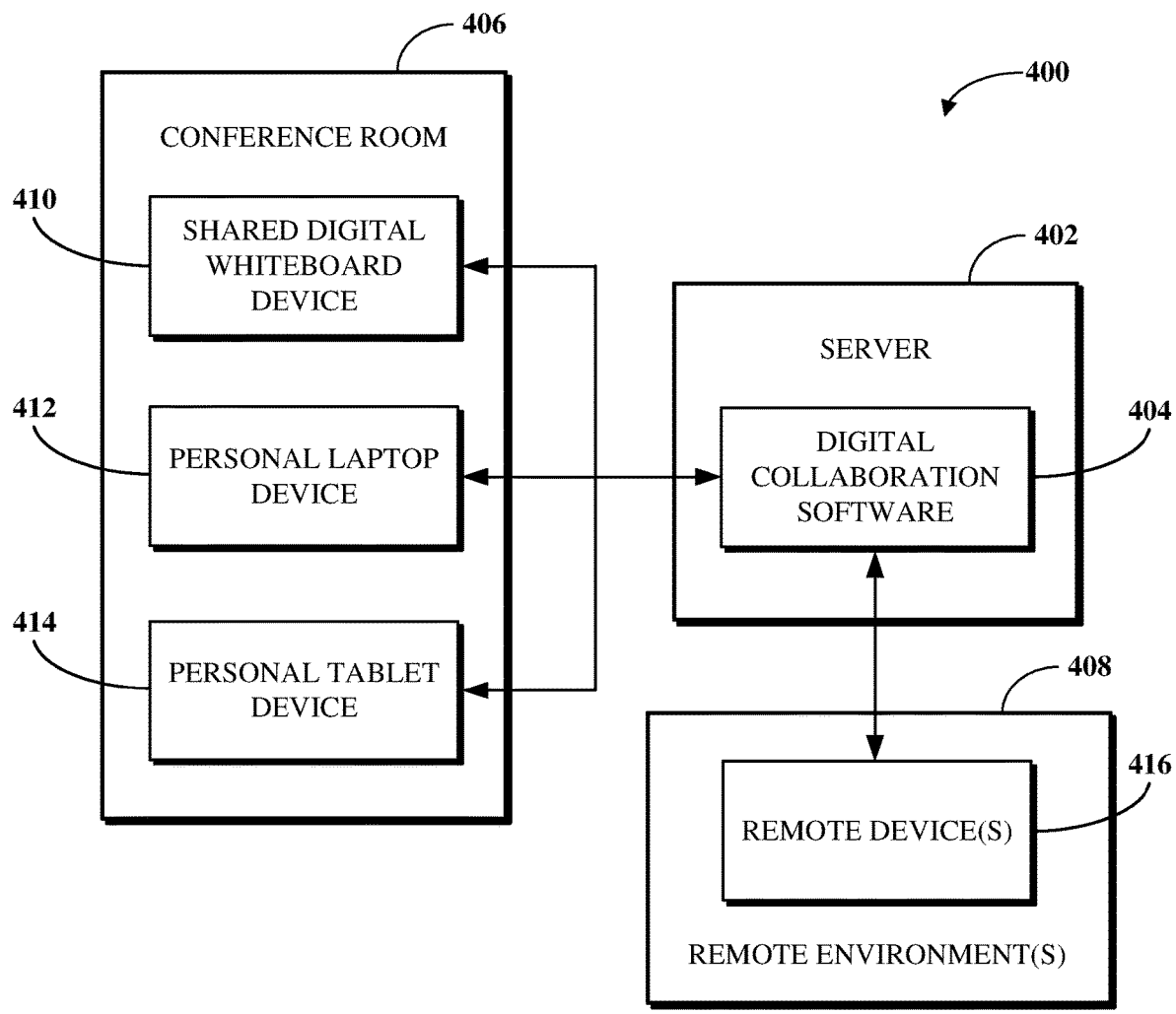
FIG. 4 is a block diagram of an example of a system for content-aware device selection for modifying content elements in digital collaboration spaces.

FIG. 4 is a block diagram of an example of a system 400 for content-aware device selection for modifying content elements in digital collaboration spaces. The system 400 includes a server 402 which runs digital collaboration software 404 for facilitating interactions within a digital collaboration space between devices of different device types and for prompting devices of device types corresponding to detected content elements for input usable to modify those content elements. The digital collaboration software 404 may, for example, be the digital collaboration software described above with respect to the other software 318 shown in FIG. 3.

A digital collaboration space instantiated or otherwise facilitated using the digital collaboration software 404 may be accessed by one or more devices in one or more locations. In particular, and as shown, the digital collaboration software may communicate with one or more devices in a conference room 406 and one or more devices in a remote environment 408. The conference room 406 may be or refer to a physical space in an office or other location. The conference room 406 may be large enough to fit multiple people and or devices within it. In particular, and as shown, the conference room 406 includes a shared digital whiteboard device 410, a personal laptop device 412, and a personal tablet device 414. However, other types of devices and/or numbers of these or other devices may be included in the conference room 406. Whereas the shared digital whiteboard device 410 is configured for use by various operators at a given time, the personal laptop device 412 and the personal tablet device 414 are configured for a single operator at a given time. The remote environment 408 includes one or more remote devices 416 which may each be personal or shared devices.

The digital collaboration space instantiated or otherwise facilitated using the digital collaboration software 404 may be interacted with by one or more of the devices 410 through 416. For example, the devices 410 through 416 may be used to add content elements to the digital collaboration space, modify content elements within the digital collaboration space, and/or remove content elements from the digital collaboration space. As used herein, a content element is, includes, or otherwise refers to an element which may be visually represented within a digital collaboration space and is configured to receive input of one or more types. Examples of content elements include, without limitation, text boxes, drawing spaces, and the like.

In some implementations, the digital collaboration space may be instantiated during a conference implemented using conferencing software, such as the conferencing software 314 shown in FIG. 3. For example, the digital collaboration space may be instantiated during a screen share operation within the conference. The digital collaboration space may then be accessed by devices connected to the conference. In some such implementations, the digital collaboration software 404 or a portion thereof may be included in the conferencing software.

The devices 410 through 416 operate and connect in a shared session with the digital collaboration space so that changes to the digital collaboration space made by one of the devices 410 through 416 are visible, generally in real-time, to all of the devices 410 through 416. In some cases, however, permissions for selectively limiting visibility into group edits to the digital collaboration space may be defined and customized (e.g., dividing the computer devices into groups to limit what computer devices can view edits). Sharing permissions for the digital collaboration space may be maintained on a paradigm basis. For example, where the digital collaboration space is accessed during a conference, the host of the conference may be recognized as the owner of the digital collaboration space with elevated permissions and control. In another example, outside of a conference setting, the digital collaboration space may be shared without a named host. The default owner of the digital collaboration space may in at least some cases be the operator of the shared digital whiteboard device 410.

Devices seeking to access the digital collaboration space may be admitted by an owner of the digital collaboration space. A device seeking to access the digital collaboration space may be identified using a pairing mechanism for pairing the device with the shared digital whiteboard device 410, an ultrasonic signal emitted by the shared digital whiteboard device 410 or an appliance device associated with being detected by the device, a sharing code, or another approach. In some cases, such as where the digital collaboration space is accessed during a conference, device operators who have signed into a client application configured to access the conferencing software may automatically be authenticated using the client application.

In some implementations, multiple devices of an individual operator may be authenticated to access the digital collaboration space through a single sign-on scheme. A single sign-on process can be performed for one device of the individual operator to allow him or her to access and connect multiple devices to the digital collaboration software 404 without having to manually input multiple username and password sets. For example, a personal device (e.g., the personal laptop device 412 or the personal tablet device 414) which is already logged in and authenticated with the shared digital whiteboard device 410 or an appliance device associated therewith can be paired therewith to share other device credentials of the other devices of the operator with the shared digital whiteboard device 410 or associated appliance device.

The digital collaboration software 404 in particular is configured to detect when a content element is added to the digital collaboration space and, responsive to that detection, to determine a content type associated with that content element. For example, the content type may be a text box or a drawing space, although other content types are possible. Responsive to determining the content type, the digital collaboration software 404 is configured to determine a device type which is optimized to modify that detected content element based on devices of that device type including one or more input components which are optimized for the content type. For example, where the content type of the detected content element is a text box, the one or more input components may include a physical keyboard given that physical keyboards are optimized for capturing text input. In another example, where the content type is a drawing space, the one or more input components may include a touch interface.

Thus, in at least some cases, not all device types are optimized for capturing input for certain content types. For example, devices such as shared digital whiteboards (e.g., the shared digital whiteboard device 410) and tablets (e.g., the personal tablet device 414) may not include a physical keyboard for capturing text input and thus may require use of a virtual keyboard displayed across the displays thereof, typically over other user interfaces in a manner which limits visibility of other information, to capture text input for text box content types. In another example, devices such as laptops (e.g., the personal laptop device 412) may not include a touch interface and thus may require use of a connected peripheral to capture touch-based input for drawing space content types.

The digital collaboration software 404 determines a device type which is optimized to provide input for certain content elements based on their content types. The digital collaboration software 404 may use definitions of input components which different device types are generally understood to include to determine which device type to use for which content types. For example, a first definition may indicate that devices of a laptop device type include physical keyboards. In another example, a second definition may indicate that devices of a tablet device type include touch interfaces.

Once the device type which is optimized to provide the input for a given content element is determined, the digital collaboration software 404 identifies one or more devices which are authenticated to access the digital collaboration space and which are of that determined device type. For example, the digital collaboration software 404 can determine device types of the authenticated devices using application programming interface (API) calls to agents on those devices, browser-based tools for discovering device type information, operating system-level information from those devices, or the like. After one or more devices of the device type are identified, the digital collaboration software 404 prompts one or more of those identified devices for input usable to modify the subject content element.

Accordingly, the digital collaboration software 404 can determine when a content element is added using a first device which is not optimized to provide input for modifying the content element and responsively prompt a second device for input usable to modify the content element, in which that second device is optimized to provide such input. For example, the shared digital whiteboard device 410 may be used to add a content element which is a text box into the digital collaboration space. Because the digital whiteboard device 410 does not include a physical keyboard but would rather require use of a virtual keyboard, the digital collaboration software 404 recognizes that it is not optimized to provide input for modifying this particular content element (e.g., by capturing text input to be included within the text box). Instead, the digital whiteboard device 410 determines which devices that are authenticated to access the digital collaboration space include a physical keyboard, such as devices which are of a laptop device type. In such a case, the digital collaboration software 404 may determine to prompt the personal laptop device 412 or a remote device 416 of the laptop device type for input.

In another example, the personal laptop device 412 may be used to add a drawing space content element into the digital collaboration space. Because the personal laptop device 412 does not include a touch interface but would rather require the use of a peripheral for touch-based input capture, the digital collaboration software 404 recognizes that it is not optimized to provide input for modifying this particular content element (e.g., by capturing freeform input to be included within the drawing space). Instead the digital whiteboard device 410 determines which devices that are authenticated to access the digital collaboration space include touch interface, such as devices which are of a digital whiteboard device type or of a tablet device type. In such a case, the digital collaboration software 404 may determine to prompt the shared digital whiteboard device 410 or the personal tablet device 414 or a remote device 416 of the digital whiteboard device type or laptop device type for input.

The use of laptop devices, laptop device types, tablet devices, and tablet device types in the above description is non-limiting as to alternative devices and device types which may be used with the system 400. For example, the conference room 406 and/or the remote environment 408 may include one or more personal desktop computer devices and/or one or more mobile phone devices. In such a case, rather than referring to laptop device types, desktop computer device types, tablet device types, and mobile phone device types, the digital collaboration software 404 may instead recognize physical keyboard device types which include laptop devices and desktop computer devices and touch interface device types which include tablet devices and mobile phone devices.

In some implementations, the digital collaboration software 404 or a portion thereof may run at the shared digital whiteboard device 410. For example, the shared digital whiteboard device 410 may include a memory and a processor configured to execute instructions stored in the memory to perform some or all of the functionality of the digital collaboration software 404.

Figure 5:
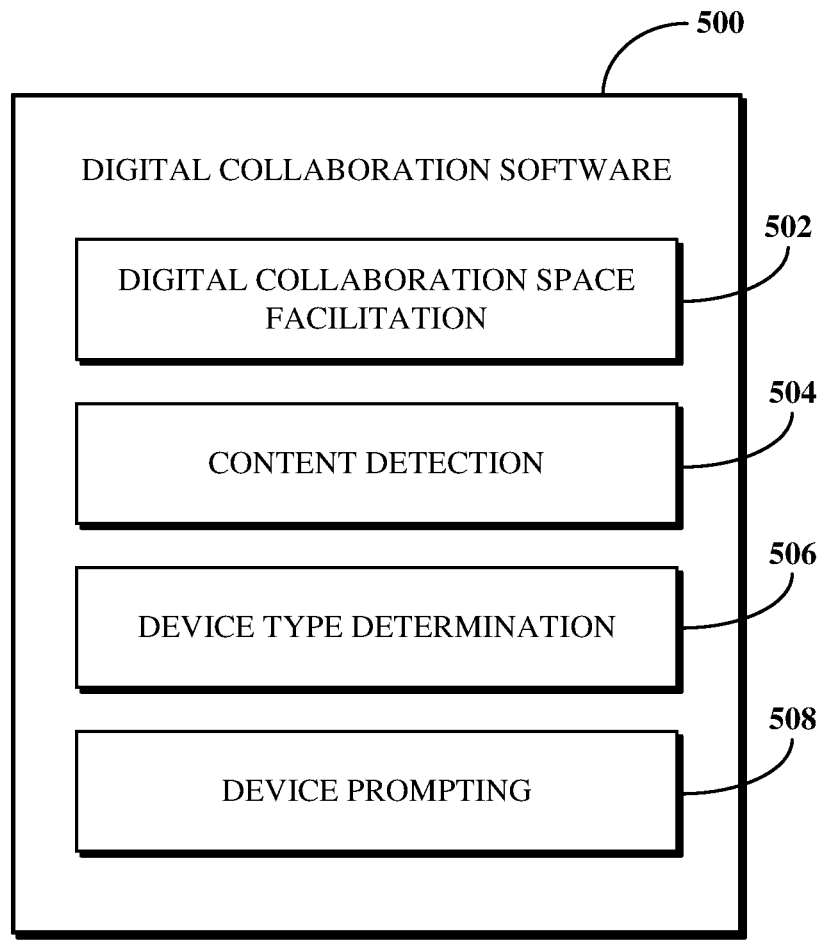
FIG. 5 is a block diagram of example functionality of digital collaboration software.

FIG. 5 is a block diagram of example functionality of digital collaboration software 500. The digital collaboration software 500 includes tools, such as programs, subprograms, functions, routines, subroutines, operations, and/or the like for facilitating interactions within a digital collaboration space between devices of different device types and for prompting devices of device types corresponding to detected content elements for input usable to modify those content elements. As shown, the digital collaboration software 500 includes a digital collaboration space facilitation tool 502, a content detection tool 504, a device type determination tool 506, and a device prompting tool 508.

The digital collaboration space facilitation tool 502 facilitates access to and use of a digital collaboration space by one or more devices. Facilitating access to and use of the digital collaboration space can include instantiating the digital collaboration space within virtual resources, such as at a server (e.g., the server 400 shown in FIG. 4) or at a shared digital whiteboard device (e.g., the shared digital whiteboard device 410 shown in FIG. 4). Facilitating access to and use of the digital collaboration space can include enabling interactions with the digital collaborations space by one or more devices, such as by the addition, modification, and/or removal of content elements. Facilitating access to and use of the digital collaboration space can include authenticating devices to allow them to access the digital collaboration space.

The content detection tool 504 detects a content element within the digital collaboration space, such as a content element added thereto based on input from a device authenticated to access the digital collaboration space. The content detection tool 504 may detect changes to the digital collaboration space by running activity lists of every addition, modification, and deletion (e.g., tracking the changes). For example, the activity lists may include information indicating devices which were used to cause those additions, modifications, and deletions and/or operators of those devices (e.g., generating a running a activity list). The activity lists may thus enable a temporal review of changes for device operators to optionally step through to understand the changes that have been made to the digital collaboration space and an order in which those changes were made thereto.

The device type determination tool 506 determines a device type which is optimized to provide input for modifying the detected content element. The device type determination tool 506 determines a content type of the content element and then compares characteristics associated with that content type against definitions of device types. For example, the device type determination tool 506 may determine one or more input components which are optimized for the content type and then determine a device type which includes those input components.

The device prompting tool 508 identifies one or more devices of the determined device type which are authenticated to access the digital collaboration space and prompts at least one of those one or more devices for input to use to modify the subject detected content element. In particular, the device prompting tool 508 first determines from amongst a selection of authenticated devices which of those are of the determined device type. This may include identifying the devices which are authenticated to access the digital collaboration space, such as using information from the digital collaboration space facilitation tool 502 or another source. For example, the devices which are authenticated to access the digital collaboration space may include devices which are paired with a shared digital whiteboard device or an appliance device associated therewith, devices within a detectable range of an ultrasonic frequency emitted by the shared digital whiteboard device or appliance device, devices of an operator who has completed a single sign-on process within an authenticated device, or other devices. In some cases, where the digital collaboration space is instantiated or otherwise accessed during a conference, the authenticated devices may include devices which are connected to the conferencing software used to implement the conference.

Once the authenticated devices are identified, the device prompting tool 508 determines which of those authenticated devices are of the determined device type. For example, the device prompting tool 508 may use records associated with those devices (e.g., stored with a software platform, such as the software platform 300 shown in FIG. 3), API calls to agents running on those devices, browser-based tools, operating system-level tools, or the like to determine the device type of individual ones of those authenticated devices. Once the one or more authenticated devices of the determined device type are identified, the device prompting tool 508 transmits a message to at least one of those one or more devices to prompt them for input to use to modify the detected content element. In some cases, only one of the devices is prompted. In other cases, multiple devices are prompted and input may be used from either only the first device to provide the input or multiple of those devices sequentially.

Although the tools 502 through 508 are shown as functionality of the digital collaboration software 500 as a single piece of software, in some implementations, some or all of the tools 502 through 508 may exist outside of the digital collaboration software 500 and/or the software platform may exclude the digital collaboration software 500 while still including the some or all of tools 502 through 508 in some form elsewhere. For example, some or all of the tools 502 through 508 may be implemented at a digital whiteboard, such as the shared digital whiteboard device 410 shown in FIG. 4.

Figure 6:
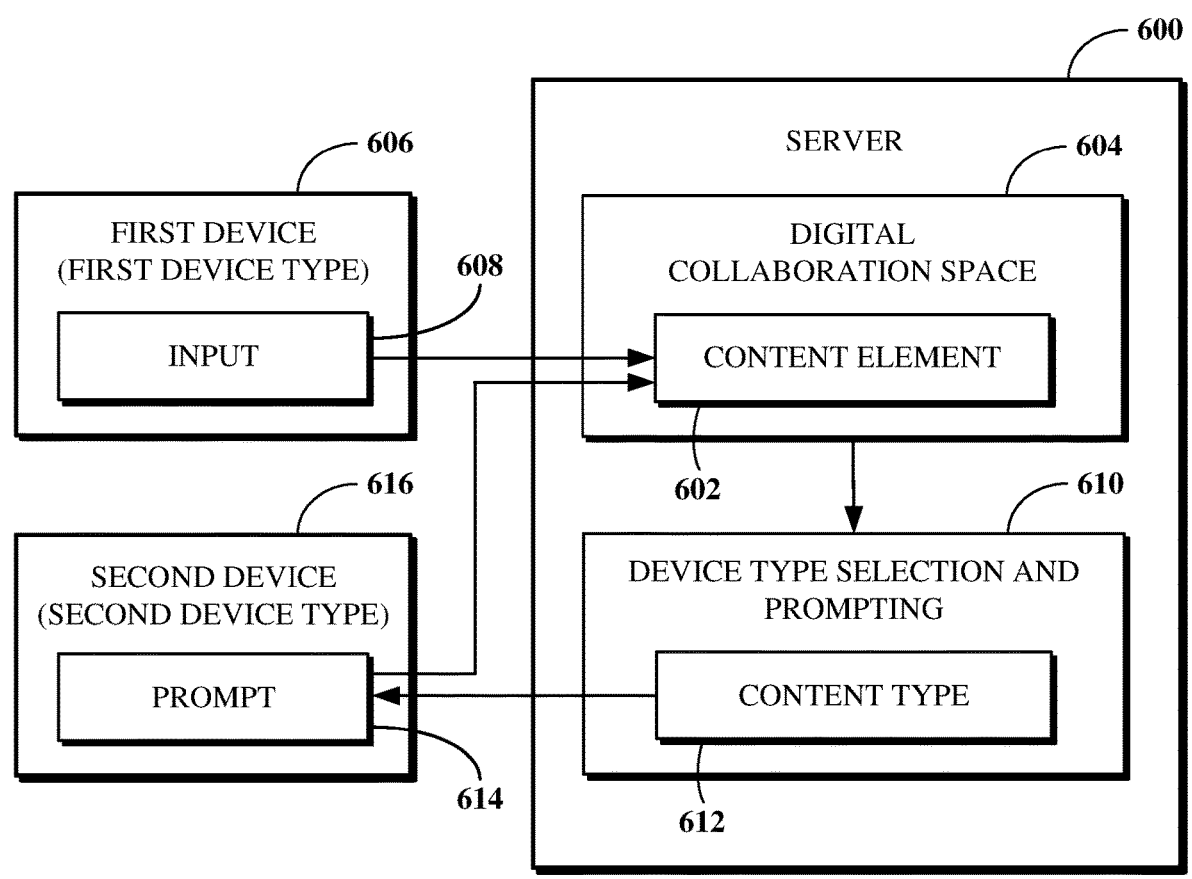
FIG. 6 is a block diagram of an example of a server running software used to select a device to modify a content element within a digital collaboration space.

FIG. 6 is a block diagram of an example of a server 600 running software used to select a device to modify a content element 602 within a digital collaboration space 604. The server 600 may, for example, be the server 400 shown in FIG. 4. The digital collaboration space 604 may be a digital collaboration space instantiated or otherwise facilitated using digital collaboration software, such as the digital collaboration software 404 shown in FIG. 4. A first device 606 in communication with the server 600 captures and transmits input 608 to cause the content element 602 to be added to the digital collaboration space 604. The first device 606 is of a first device type 606. In some cases, the first device 606 may be a shared digital whiteboard device, such as the shared digital whiteboard device 410 shown in FIG. 4. Alternatively, the first device 606 may be another device authenticated to access the digital collaboration space 604 and/or connected to the shared digital whiteboard device.

In response to the input 608, and more specifically in response to the detection of the content element 602 within the digital collaboration space 604, a device type selection and prompting aspect 610 determines a device type to use to obtain input for modifying the content element 602 based on a determined content type 612 of the content element 602. The device type selection and prompting aspect 604 may be or include tools of digital collaboration software, such as the digital collaboration software 404 shown in FIG. 4. For example, the device type selection and prompting aspect 610 may determine that the first device type is optimized for providing the input and thus either prompt the first device 606 for that input or take no prompting action given that the first device 606 is in use as indicated by the addition of the content element 602 based on the input received from the first device 606.

In another example, however, the device type selection and prompting aspect 610 may determine that the first device type is not optimized for providing the input. In such a case, the device type selection and prompting aspect 610 determines a second device type to use for the input for modifying the content element 602 based on the content type 612. Once the second device type is determined, the device type selection and prompting aspect 610 identifies one or more devices of the second device type which are authenticated to access the digital collaborations pace 604 and thereafter prompts at least one of those devices for input to use to modify the content element 602. In particular, the device type selection and prompting aspect 610 can transmit a message, as a prompt 614, to a second device 616 of the second device type identified as one of the one or more authenticated devices. In response to the prompt 614, input is received from the second device 616 and used to modify the content element 602 within the digital collaboration space 604.

In some implementations, the digital collaboration space is hosted by a shared digital whiteboard device, such as the shared digital whiteboard device 410. For example, the digital collaboration software which instantiates or otherwise facilitates the digital collaboration space may run at the shared digital whiteboard device 410. In such a case, the first device 606 may be the shared digital whiteboard device 410 or another device authenticated to access the digital collaboration space through the shared digital whiteboard device 410. The shared digital whiteboard device may be the first device 606, the digital collaboration space 604 may be located at the first device 606, and the device type selection and prompting aspect 612 may be located at the first device 606. In some such implementations, the server 600 may be omitted.

Figure 7:
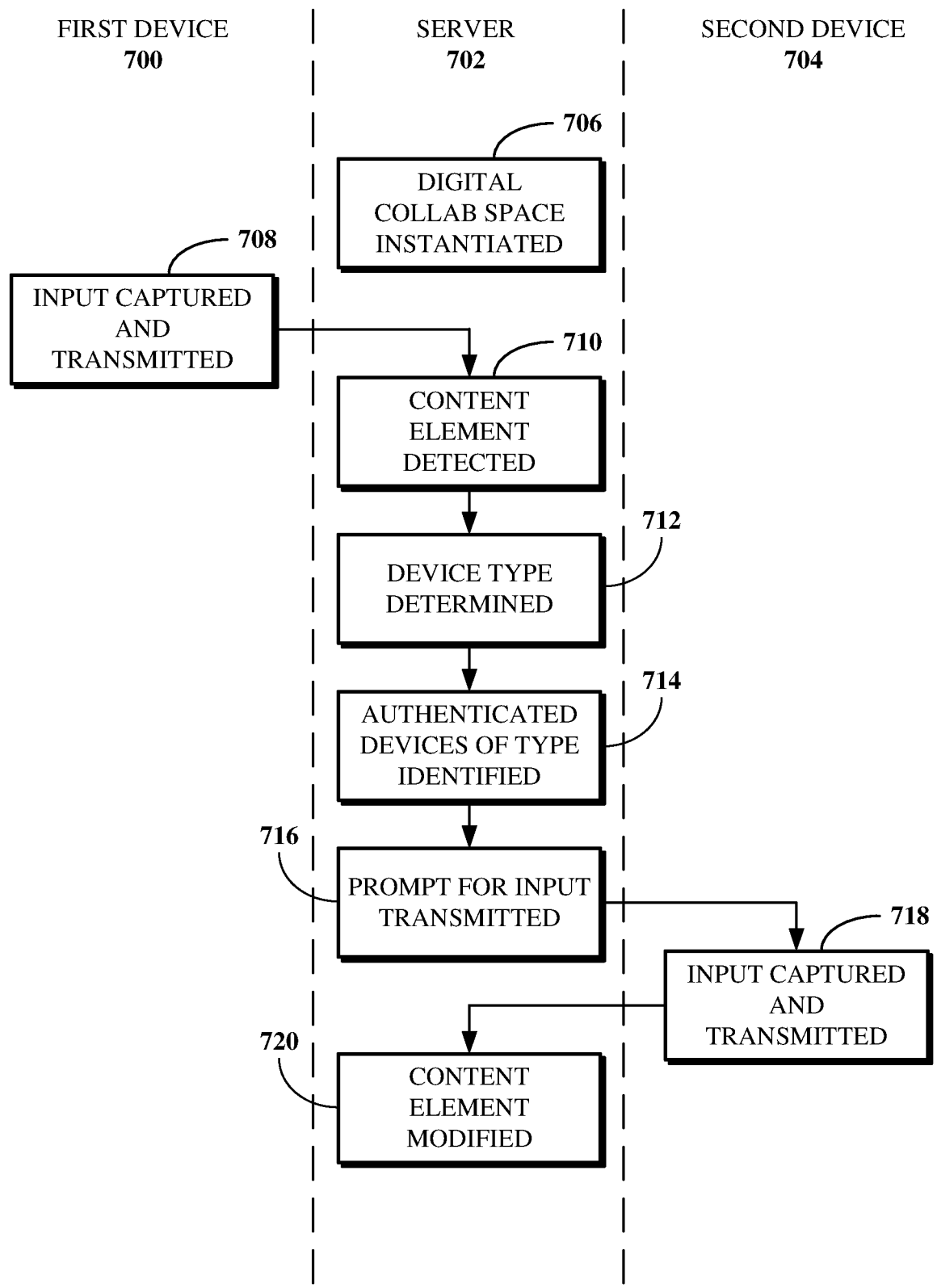
FIG. 7 is an illustration of swim lanes showing an example sequence of operations performed for content-aware device selection for digital collaboration spaces.

FIG. 7 is an illustration of swim lanes showing an example sequence of operations performed for content-aware device selection for digital collaboration spaces. In particular, the sequence of operations is between a first device 700, a server, 702, and a second device 704, which may, for example, respectively be the first device 606, the server 600, and the second device 608 shown in FIG. 6. At 706, a digital collaboration space is instantiated at the server 702. At 708, input is captured at the first device 700 and transmitted from the first device 700 to the server 702. At 710, the server 702 detects a content element based on the input from the first device 700. At 712, the server 702 determines a device type to use to modify the detected content element based on a content type of the detected content element. At 714, the server 702 identifies one or more devices of the device type which are authenticated to access the digital collaboration space. At 716, a prompt for input is transmitted from the server 702 to the second device 704, which is one of the one or more authenticated devices of the device type. At 718, responsive to the prompt, input is captured at the second device 704 and transmitted to the server 702. At 720, the content element is modified based on the input from the second device 704.

Figure 8:
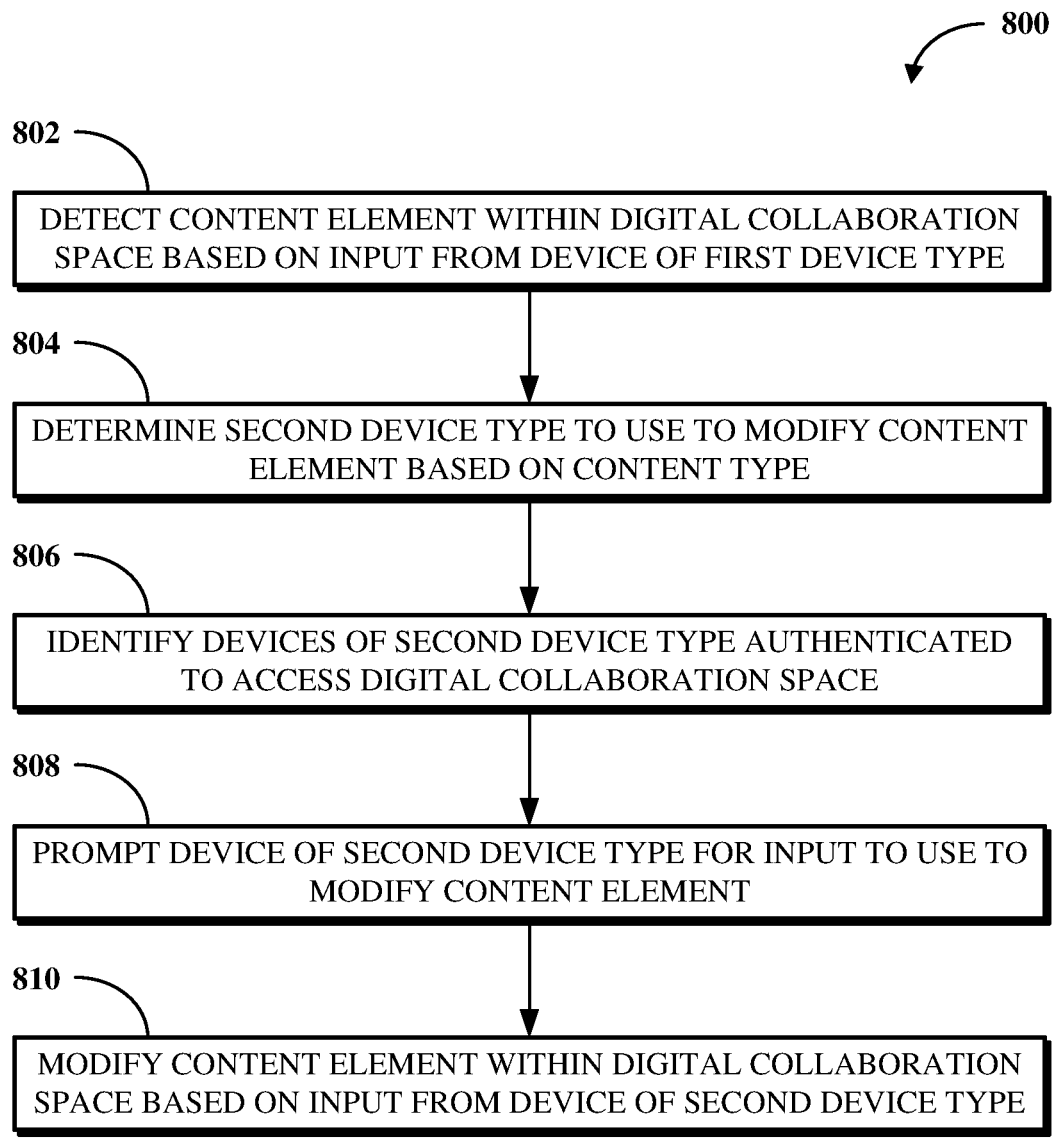
FIG. 8 is a flowchart of an example of a technique for content-aware device selection for modifying content elements in digital collaboration spaces.

To further describe some implementations in greater detail, reference is next made to examples of techniques which may be performed by or using a system for content-aware device selection for modifying content elements in digital collaboration spaces. FIG. 8 is a flowchart of an example of a technique 800 for content-aware device selection for modifying content elements in digital collaboration spaces. The technique 800 can be executed using computing devices, such as the systems, hardware, and software described with respect to FIGS. 1-7. The technique 800 can be performed, for example, by executing a machine-readable program or other computer-executable instructions, such as routines, instructions, programs, or other code. The steps, or operations, of the technique 800 or another technique, method, process, or algorithm described in connection with the implementations disclosed herein can be implemented directly in hardware, firmware, software executed by hardware, circuitry, or a combination thereof.

For simplicity of explanation, the technique 800 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 802, a content element is detected within a digital collaboration space based on input received from a first device of a first device type. The first device may, for example, be a shared digital whiteboard device or another device. The content element is added to the digital collaboration space based on the input received from the first device. Detecting the content element within the digital collaboration space based on the input received from the first device of the first device type may thus include detecting that the content element has been added to the digital collaboration space using the first device of the first device type.

At 804, a second device type to use to modify the content element is determined based on a content type of the content element. In particular, the second device type to use to modify the content element is determined responsive to first determining that the first device from which the input used to add the content element within the digital collaboration space is received is not optimized to provide input for modifying that content element. That is, the technique 800 may not proceed to 804 where the content element is of a content type for which the first device type is optimized. However, where the technique 800 does proceed to 804 such as because the first device type is determined to not be optimized for the content type of the content element, determining the second device type for modifying the content element based on the content type associated with the content element includes determining one or more input components which are optimized for the content type and thereafter determining that devices of the second device type include the one or more input components.

At 806, one or more devices of the second device type which are authenticated to access the digital collaboration space are identified. The one or more devices include one or more devices located within a conference room which includes a shared digital whiteboard device used for the digital collaboration space and/or one or more devices located external to the conference room, such as one or more remote devices. Identifying the one or more devices may first include identifying devices which are authenticated to access the digital collaboration space. Devices which are authenticated to access the digital collaboration space include devices which are currently accessing the shared collaboration space at the time the content element is detected, devices which are paired with the shared digital whiteboard device or an appliance device associated therewith, other devices registered to an operator of a device which is authenticated to access the digital collaboration space, or the like. Once the one or more devices are identified, they are filtered according to device type to identify the one or more devices of the second device type.

At 808, a second device of the one or more devices of the second device type is prompted for input to use to modify the content element. The second device of the second device type is prompted to modify the content element responsive to an identification of the second device as one of the one or more devices of the second device type. Prompting the second device for input to use to modify the content element includes transmitting a message to the second device including a request for input usable to modify the content element. The prompt may cause a change in operational state of the second device where the second device is in a sleep or other standby mode, such as by causing the second device to wake up. The prompt may cause the digital collaboration space to load on the second device. In some implementations, prompting the second device for the input includes prompting multiple devices of the one or more devices of the second device type for input to use to modify the content element, such as where multiple such devices are identified.

At 810, the content element is modified within the digital collaboration space based on input received from the second device of the second device type. The input is received from the second device of the second device type responsive to the second device of the second device type being prompted to modify the content element. Modifying the content element based on the input received from the second device includes causing a visual representation of the content element within the digital collaboration space to include input captured at and transmitted from the second device responsive to the prompt for the input. In some implementations, where multiple devices of the second device type are prompted for input, modifying the content element may include modifying the content element based on a first received input from one of those multiple devices or sequentially modifying the content element using input received from one or more of those multiple devices.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
   determining, in response to an addition of a content element within a digital collaboration space by a first computing device of a first device type, with a processor, a second device type for modifying the content element based on a content type associated with the content element, wherein the first device type is different from the second device type;
   determining, with the processor, whether the first device type or the second device type are capable of providing an input, based on the content type;
   prompting, for input to modify the content element, multiple computing devices that are of the second device type and which have access to the digital collaboration space, wherein the first computing device and the multiple computing devices each include a processor, memory, and a display;
   determining that the multiple computing devices are authenticated to access the digital collaboration space;
   determining that multiple devices of an individual operator are authenticated to the digital collaboration space through a single sign-on scheme;
   receiving, based on the prompting, the input from a computing device of the multiple computing devices;
   modifying the content element within the digital collaboration space based on the input;
   determining one or more input components usable to provide the input based on the content type; and
   determining that the second device type corresponds to the one or more input components.

2. The method of claim 1, wherein prompting the computing devices comprises:
   identifying the multiple computing devices that are of the second device type and are authenticated to access the digital collaboration space; and
   prompting the multiple computing devices of the second device type to modify the content element.

3. The method of claim 1,
   wherein the multiple computing devices are authenticated to access the digital collaboration space based on pairings between ones of the multiple computing devices and a shared digital whiteboard device connected to the digital collaboration space.

4. The method of claim 1, wherein first input used to add the content element within the digital collaboration space is received from the first computing device, and wherein determining the second device type for modifying the content element based on the content type comprises:
   determining that the first computing device is not optimized for the content type.

5. The method of claim 1, wherein the digital collaboration space is a digital whiteboard and the content type is one of a text box or a drawing space and the second device type is prompted based upon the second device type being capable of modifying the text box or being capable of modifying the drawing space.

6. The method of claim 1, further comprising:
   detecting, with a content detection tool, changes to the digital collaboration space, and
   tracking the changes to the digital collaboration space.

7. The method of claim 1, further comprising:
   selectively limiting visibility of edits made to the digital collaboration space based on a division of the multiple computing devices into groups so that a view of edits from one of the groups is limited to another of the groups.

8. The method of claim 1, wherein not all device types of the multiple computing devices are capable of capturing input for every content type.

9. A non-transitory computer readable medium storing instructions operable to cause one or more processors to perform operations comprising:
   determining, in response to an addition of a content element within a digital collaboration space by a first device of a first device type, with a processor a second device type for modifying the content element based on a content type associated with the content element, wherein the first device type is different from the second device type;
   determining, with the processor, whether the first device type or the second device type are capable of providing an input, based on the content type;
   prompting, for input to modify the content element, multiple computing devices that are of the second device type and which have access to the digital collaboration space, wherein the first computing device and the multiple computing devices each include a processor, memory, and a display;
   determining that the multiple computing devices are authenticated to access the digital collaboration space;
   determining that multiple devices of an individual operator are authenticated to the digital collaboration space through a single sign-on scheme;
   receiving, based on the prompting, the input from a computing device of the multiple computing devices;
   modifying the content element within the digital collaboration space based on the input;
   determining one or more input components usable to provide the input based on the content type; and
   determining that the second device type corresponds to the one or more input components.

10. The non-transitory computer readable medium of claim 9, the operations comprising:
   identifying the multiple computing devices based on the determination of the second device type; and
   adding the content element within the digital collaboration space to cause the content element to be accessible to the multiple computing devices.

11. The non-transitory computer readable medium of claim 9, wherein the multiple computing devices are located within a room which includes a digital whiteboard device used with the digital collaboration space, and wherein access of the multiple computing devices to the digital collaboration space is based on pairings of ones of the multiple computing devices with the digital whiteboard device.

12. The non-transitory computer readable medium of claim 9, wherein the digital collaboration space is implemented during a video conference to which at least some of the multiple computing devices are connected.

13. The non-transitory computer readable medium of claim 9, further comprising:
   detecting, with a content detection tool, changes to the digital collaboration space, and
   tracking the changes to the digital collaboration space, wherein the content detection tool detects the changes to the digital collaboration space and generates a running activity list of the changes to the digital collaboration space.

14. The non-transitory computer readable medium of claim 9, the operations comprising:
   determining that some of the device types are not capable of capturing input for some of the content types.

15. A system, comprising:
   one or more memories; and
   one or more processors configured to execute instructions stored in the one or more memories to:
      determine, in response to an addition of a content element within a digital collaboration space by a first device of a first device type, with a processor a second device type for modifying the content element based on a content type associated with the content element, wherein the first device type is different from the second device type;
      determine, with the processor, whether the first device type or the second device type are capable of providing an input, based on the content type;
      prompt, for input to modify the content element, multiple computing devices that are of the second device type and which have access to the digital collaboration space, wherein the first computing device and the multiple computing devices each include a processor, memory, and a display;
      determine that the multiple computing devices are authenticated to access the digital collaboration space;
      determine that multiple devices of an individual operator are authenticated to the digital collaboration space through a single sign-on scheme;
      receive, based on the prompting, the input from a computing device of the multiple computing devices;
      modify the content element within the digital collaboration space based on the input;
      determine one or more input components usable to provide the input based on the content type; and
      determine that the second device type corresponds to the one or more input components.

16. The system of claim 15, wherein, to determine the second device type for modifying the content element based on the content type, the one or more processors are configured to execute the instructions to:
   determine, based on the content type being a text box, that the second device type corresponds to one or more input components including a physical keyboard.

17. The system of claim 15, wherein, to determine the second device type for modifying the content element based on the content type, the one or more processors are configured to execute the instructions to:
   determine, based on the content type being a drawing space, that the second device type corresponds to one or more input components including a touch interface.

18. The system of claim 15, wherein the multiple computing device includes a first memory and a first processor, and wherein the content element is added within the digital collaboration space based on input received from the first computing device including a second memory and a second processor.

19. The system of claim 15, wherein the content element is modified according to multiple input received from multiple ones of the multiple computing devices based on the prompting.

20. The system of claim 15, further comprising:
   a device prompting tool that prompts the multiple computing devices and the device prompting tool transmits a message to the first device type or the second device type to provide input.

* * * * *